United States Patent [19]

Schober

[11] 4,264,928

[45] Apr. 28, 1981

[54] CONFERENCE VIDEO SYSTEM

[76] Inventor: Gary W. Schober, 3 Price Dr., Edison, N.J. 08817

[21] Appl. No.: 91,408

[22] Filed: Nov. 5, 1979

[51] Int. Cl.³ .............................................. H04N 7/18
[52] U.S. Cl. ................................. 358/125; 358/206; 358/85; 340/694; 179/1 CN
[58] Field of Search ............... 358/125, 199, 206, 87, 358/85; 179/1 CN, 1 DM; 340/694; 318/560

[56] References Cited

U.S. PATENT DOCUMENTS

| | | | |
|---|---|---|---|
| 3,488,439 | 1/1970 | Laird et al. | 358/108 |
| 4,024,573 | 5/1977 | Carmes | 358/108 |
| 4,058,831 | 11/1977 | Smith | 358/87 |
| 4,067,015 | 1/1978 | Mogavero et al. | 340/694 |
| 4,184,048 | 1/1980 | Alcaide | 179/1 CN |

Primary Examiner—Robert L. Griffin
Assistant Examiner—Edward L. Coles
Attorney, Agent, or Firm—Robert A. Green

[57] ABSTRACT

The system includes a plurality of conference seats, at each of which is a microphone. The system also includes a TV camera and a pivotable mirror which directs light from the conference seats to the TV camera. Each of the microphones is coupled through circuit elements to a servomotor(s) which positions the mirror to focus on the speaker and aims the camera's field of vision toward active audio. The electronic portion of the system utilizes the time two adjacent microphones receive a speaker's voice to generate a signal used to drive the servomotor to perform its mirror-positioning function.

4 Claims, 5 Drawing Figures

CONFERENCE VIDEO SYSTEM

BACKGROUND OF THE INVENTION

Conference TV systems are known; however, each is subject to some criticism. Such known systems have one or more of the following faults:

1. High cost
2. Excessive complexity
3. Require many TV cameras
4. Sensitivity to noise
5. Require cameramen
6. TV picture loses perspective of vision
7. Delicate camera balancing required
8. Inability to simulate eye movement

SUMMARY OF THE INVENTION

The present invention provides a conference TV system which overcomes the problems set forth above by utilizing a mirror, whose position is variably controlled by each speaker's microphone, to direct light rays from the speaker to the TV camera.

DESCRIPTION OF THE DRAWINGS

FIG. 4 is a schematic representation of a portion of the system of the invention; and FIG. 5 is a schematic representation of another portion of the system of the invention.

DESCRIPTION OF THE PREFERRED EMBODIMENTS

Figure 1:
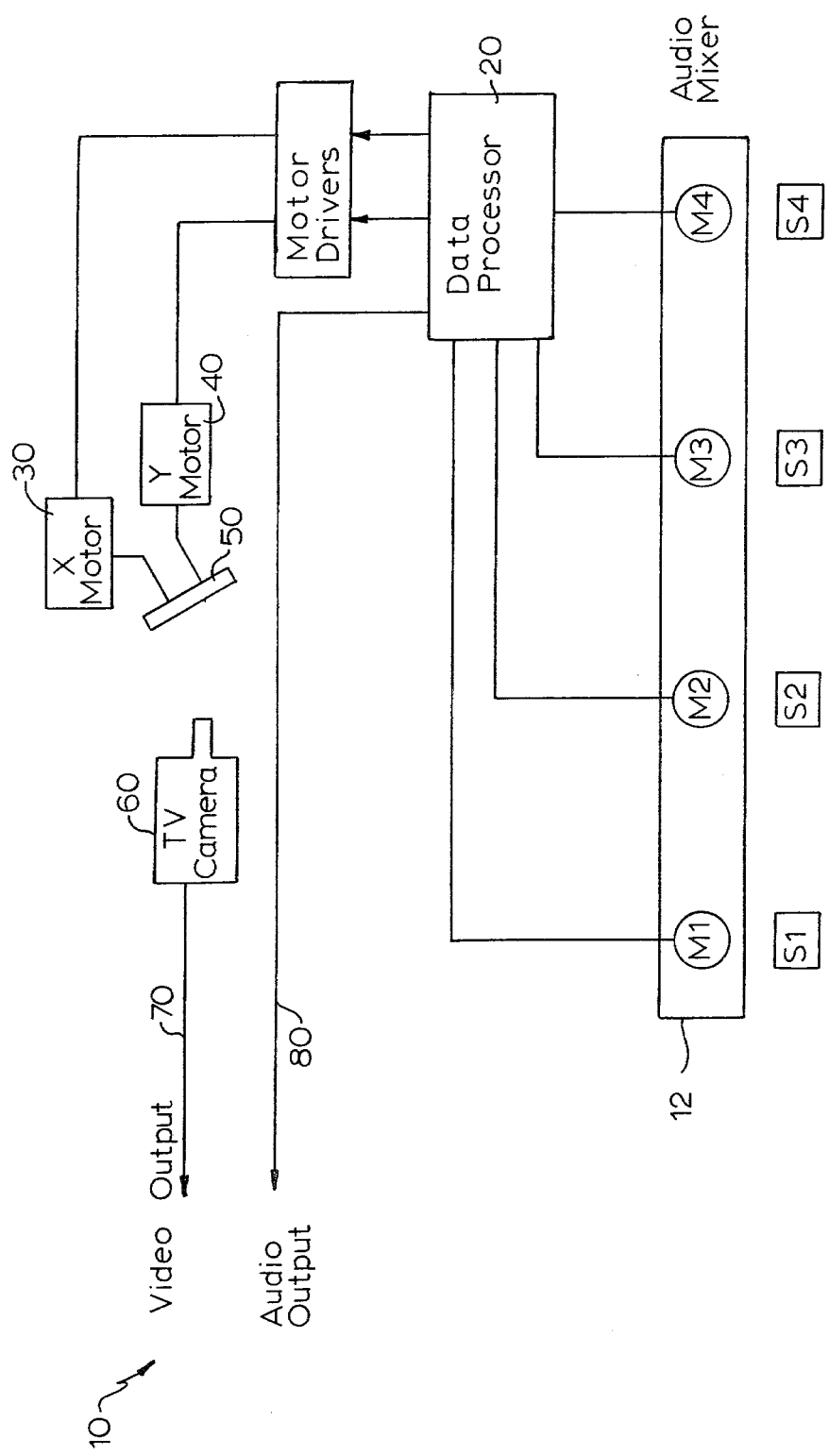
FIG. 1 is a block diagram of the system of the invention.

The system of the invention 10, referring to FIG. 1, includes a plurality of conference positions S1, S2, ... Sn, positioned along a conference table 12 with a microphone M1, M2, ... Mn provided at each conference location. Each microphone M is coupled through electronic circuitry 20 including a microprocessor to an X-axis drive servomotor 30 (for panning) and an optional Y-axis drive servomotor 40 (for tilting) a mirror 50 to focus on an individual who is speaking into a microphone. The Y-axis drive servomotor would not be required in most systems. The mirror 50 directs light rays to a TV camera 60 which transmits its picture to a remote location on bus 70. The desired audio signal is fed out of the circuitry 20 on bus 80. The distance from the mirror 50 to each microphone is preferably the same, e.g., 6 feet or so. (Otherwise, a zoom lens is added and controlled by the microprocessor to be described.)

Figure 2:
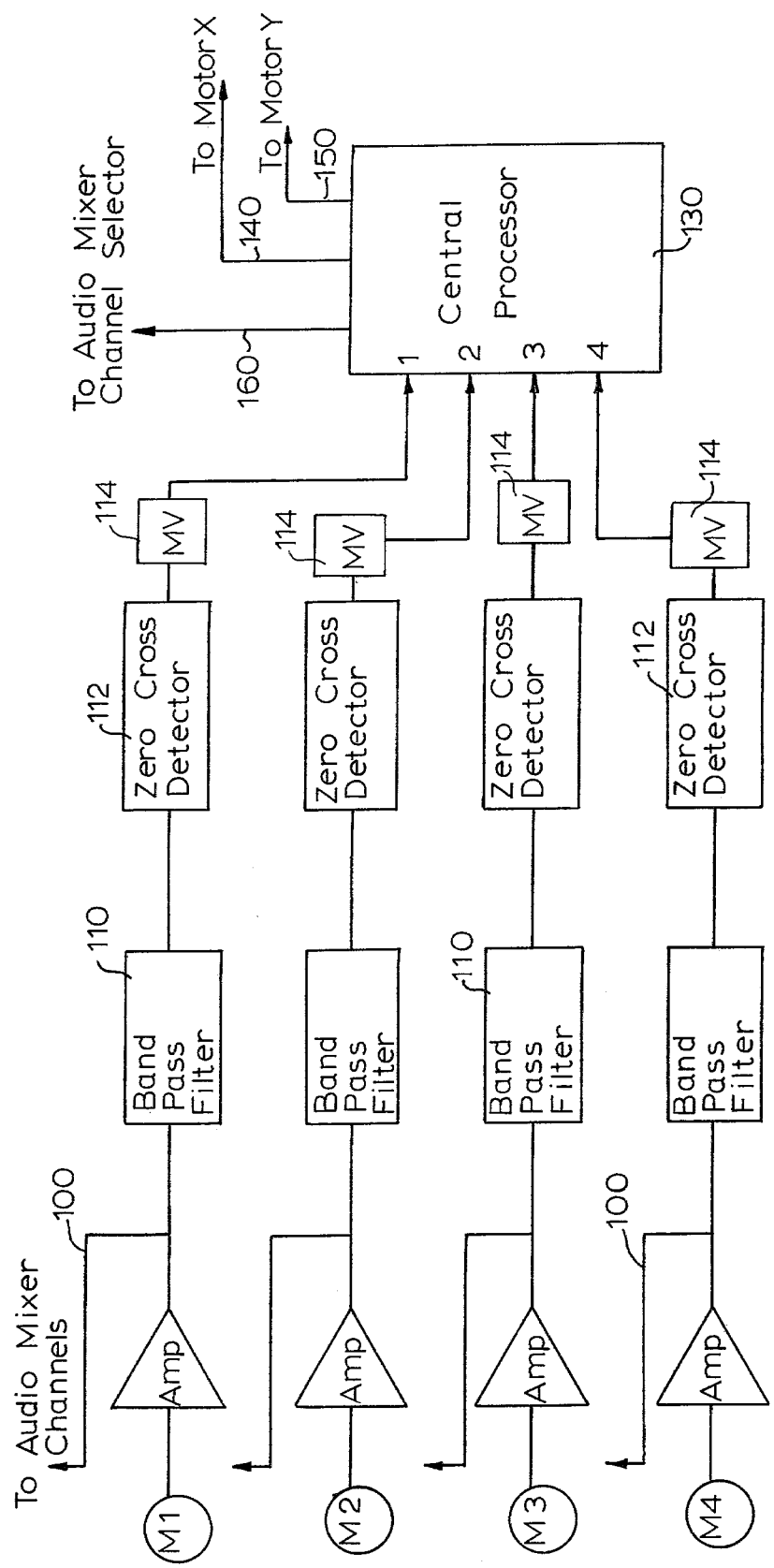
FIG. 2 is a more detailed block diagram of the invention.

Referring to FIG. 2 for a more detailed description of the invention, each microphone M is connected to the input of an amplifier 90 and (1) to an audio mixer by lead 100 and (2) through a band pass filter 110 to limit room noise, a zero crossover detector 112, and single-shot multivibrator 114 to a central processor (CPU) 130. Each detector 112 operates as a switch to signal the CPU on an interrupt request basis. One output of the central processor 130 is coupled by lead 140 to the X direction control motor 30 for mirror 50, and, if desired or needed, another output of the central processor is coupled by lead 150 to the Y direction control motor 40 for mirror 50.

The audio signal output from the central processor unit 130 appears on output lead 160.

A conventional pulse proportional servosystem is used, in one embodiment of the invention, to operate the motors 30 and 40 to drive the mirror 50. Such a system uses pulse width to control the motor operation.

Figure 3:
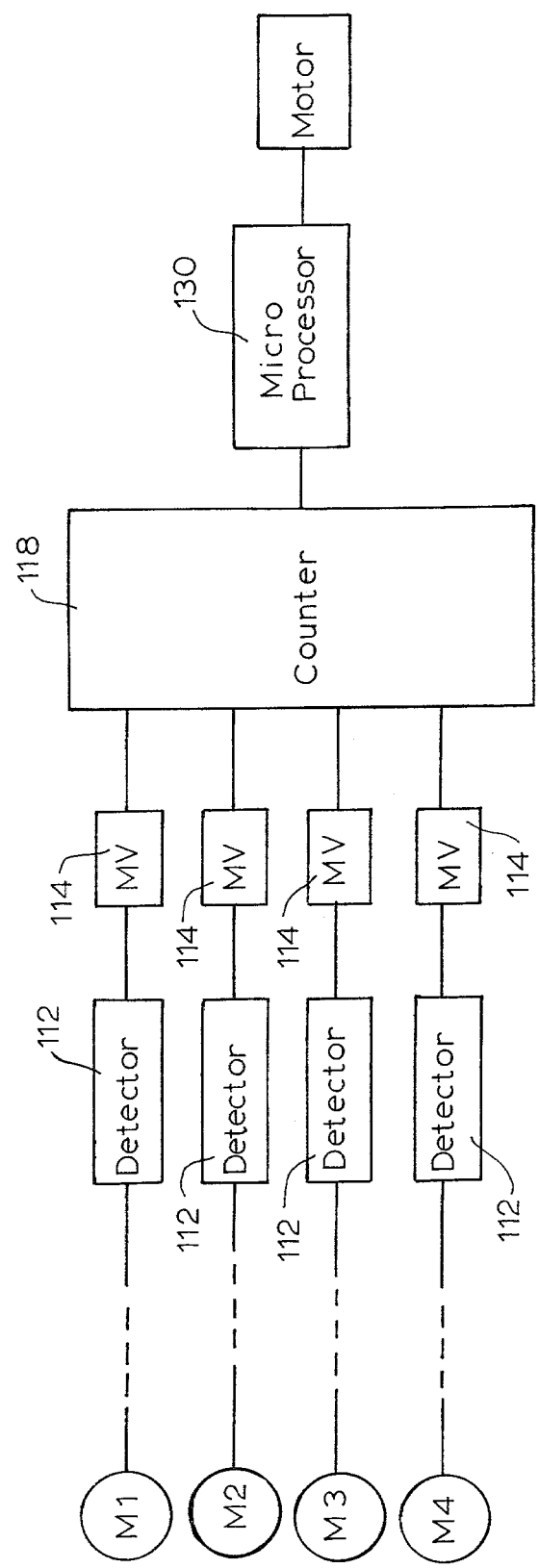
FIG. 3 is a more detailed block diagram of a portion of the system of the invention.

The principles of the invention are illustrated in somewhat greater detail in FIG. 3, which shows each detector connected through its multivibrator 114 to a counter 118 which may be a portion of the processor 130.

In operation of the invention, when a conference participant, e.g. at position S2, speaks, his microphone M2 picks up his speech and a narrow pulse appears at the output of the filter 110, indicating the beginning of an utterance. A signal is coupled through the associated multivibrator 114 to turn on the counter 118. Milliseconds later, the original utterance by the speaker at position S2 is detected by another microphone, e.g. at position S3, and this produces a signal which turns off the counter. The elapsed time is processed in the processor 130 to generate a signal whose length or time duration turns the mirror the proper amount to position it on the speaker at position S2. This time delay may range from zero to six milliseconds. A zero delay indicates to the processor that the speaker's voice came from a position equidistant from two adjacent microphones.

The system of the invention is shown in greater detail in FIGS. 4 and 5. When a vocal sound occurs at a microphone, the output of the associated zero-crossover detector 112 will become low, representing a negative-going pulse at one of the inputs to NAND gate 170. The resultant output of NAND gate 170 is inverted by gate 174 and fed to J-K flip-flop 180. At the same time, the positive pulse on the output of NAND gate 170 triggers one-shot multivibrator 184 whose purpose is to establish a nominal two-second window to count the elapsed time between the first microphone utterance and sound received from an adjacent microphone, said first microphone representing the gross vicinity of an utterance, and the delayed sound (received slightly later) representing the offset. When no one is talking, the one-shot multivibrator 184, after a time period determined by its components (e.g. 2 secs.), returns to its reset state and triggers one-shot multivibrator 188, thereby creating a negative-going pulse which has a time duration of about 1 us, and this sets the flip-flop 180 so that it is ready to make the next sampling operation. One-shot multivibrator 188, therefore, provides a single sample of the beginning utterance, and inhibits further samples until the audio acitivity is discontinued for two seconds or someone else begins to speak.

The purpose of the J-K flip-flop 180 is to condition either the "start" or "stop" latches 190 or 194 to detect the fist reporting microphone. The latch 194 is used to save the data corresponding to the second microphone which detects the original voice signal. The signals from the two reporting microphones and the two others are used as the most significant bits of an 8-bit word, representing the position of the speaker. The stepper motor driving the pivotable mirror will always follow this value plus or minus the offset contained in binary-coded decimal 4-bit counters 198 or 200.

Once the initial microphone audio signal is detected at one of the inputs of NAND gate 170 and latched into date latch 190, the flip-flop 180 toggles to start counting up and down on counters 198 and 200. Clock pulses to the up-counter 198 and the down-counter 200 are fed from astable oscillator 202 which is enabled from start NAND gate 206, whose output will be high when either the Q output of multivibrator 184 or J-K flip-flop 189 is low, thereby permitting the odscillator 202 to generate pulses, and counters 198 and 200 to both count. This counting stops as soon as the second microphone audio signal is received. The microphone that causes the stopping is remembered in "stop" latch 194. In this way, counters 198 and 200 store the delay between reports. The start latch 190 and stop latch 194 store the gross positional value. Counters 198 or 200 compute the delay and are selected to subtract or add this offset to the most significant digit (MSD).

Magnitude comparator 210 examines the value of date in latches 190 and 194 and decides which 4-bits will be selected by data selector 214 to represent the most significant digits (MSD) of positional value based on the following algorithms:

(A) If the second microphone report is smaller than the first report, the data value of stop latch 194 is represented as the MSD. The offset or least significant digit (LSD) is the value contained in counter 198.

(B) If the second microphone report is larger than the initial report, the start data value contained in latch 190 represents the MSD. The offset (which is the least significant digit) is contained in "Down" counter 200.

Data selector 218, also driven by magnitude comparator 210, is switched to select the corresponding LSD digits.

Astable oscillator 202 has its frequency set to be such that sixteen clock output pulses divide the equivalent delay time between any two microphones. Therefore, the MSD value trapped by the start or stop data latches 190 or 194 are subdivided into sixteen parts to accurately position the mirror.

The stepper motor driving the mirror is positioned to always track the digital 8-bit word out of the data processor. This tracking of the stepper is done with conventional binary comparison and tachometering of the mirror 50, to establish initial starting value when power is first applied. A simple pulse counter circuit compared to the 8-bit word is all this is required. The oscillator will always pulse the stepper driver until the equal output of the magnitude comparator is reached.

Referring to FIG. 5, data bits $B_0$ to $B_7$ represent the positional value of the speaker's audio signal. These data bits come from data selectors 214 and 218, representing the MSD and LSD, respectively. This data is fed to magnitude comparator 300 which compares the value in two 4-bit counters 310 (MSD) and 320 (LSD) containing the current mirror's position. There are three outputs from magnitude comparator 300. The output symbol < means that the mirror must be moved, say, left until the output of the magnitude comparator is equal (=), while the symbol > indicates that the mirror is, say, right of the correct position and the motor must be stepped right to cause the output to be =. Note that the output of comparator 300 is inverted by inverter 370 and presented to oscillator 330. When the value in the 4-bit counters differs from the data presented to the magnitude comparator, the inequality causes the oscillator 330 to provide output pulses to the mirror stepper motor and also to the counters 310 and 320. When they are equal, the oscillator 330 is halted and the new positional value is reached. The "greater than" or "less than" signals to the driver condition the direction of stepping, while the oscillator 330 is enabled and causes the movement.

It is noted again that module 130 may be a single microprocessor which is able to perform all of the necessary counting and timing functions required by the invention.

What is claimed is:

1. Video conference apparatus comprising a TV pickup camera
   a mirror rotatable to direct light from a physical location to said camera,
   motor means coupled to said mirror for rotating said mirror,
   a plurality of microphones spaced apart in an array and comprising separate generally fixed physical locations from which light is to be transmitted to said camera,
   first circuit means coupled to each microphone for detecting voice signals and generating electrical signals therefrom, and
   second circuit means for comparing the time difference between signals generated by two adjacent microphones receiving the same voice signal and for generating drive signals for said motor means to cause said motor means to rotate said mirror to focus on the individual who uttered said voice signals and direct light therefrom to said TV pickup camera.

2. The apparatus defined in claim 1 wherein said first circuit means for each microphone includes, in series, an amplifier, a band-pass filter, a zero crossing detector, and a multivibrator.

3. Video conference apparatus comprising
   a TV pickup camera,
   a mirror rotatable to direct light from a physical location to said camera,
   motor means coupled to said mirror for rotating said mirror,
   a plurality of microphones spaced apart in an array and comprising separate generally fixed physical locations to be focussed on by said mirror,
   first circuit means coupled to each microphone for detecting voice signals and generating electrical signals therefrom, and
   second circuit means for comparing the time difference between signals generated by two microphones receiving the same voice signal and for generating drive signals for said motor means to cause said motor means to rotate said mirror to focus on the individual who uttered said voice signals,
   each first circuit means being coupled to said second circuit means which includes a counter which is adapted (1) to be turned on by the microphone which first detects a voice signal and (2) to be turned off by the microphone which next detects said voice signal.

4. Video conference apparatus comprising
   a TV pickup camera,
   a mirror rotatable to direct light from a physical location to said camera,
   a plurality of microphones spaced apart in an array and comprising separate generally fixed physical locations from which light is to be transmitted to said mirror, a separate electronic detector means coupled to each microphone, a counter into which each electronic detector means is coupled, the coupling between said detector means and said counter being such that a first microphone, which picks up a voice signal, operates through its detector means to turn on said counter and cause it to count, and a second microphone which picks up said voice signal operates through its detector means to turn off said counter after a number of counts have been generated by said counter, said number of counts representing the time difference between the time when said first microphone picks up said voice signal and said second microphone picks up said voice signal, and means coupled to the output of said counter for generating control signals coupled to said mirror for rotating said mirror to pick up light from the physical location at which said voice signal originated.

* * * * *